United States Patent

[11] 3,554,219

| [72] | Inventor | Harry W. Hudson |
| | | Littleton, Colo. |
| [21] | Appl. No. | 702,249 |
| [22] | Filed | Feb. 1, 1968 |
| [45] | Patented | Jan. 12, 1971 |
| [73] | Assignee | Twentieth Century Products Corporation |
| | | Englewood, Colo. |

[54] TOILET TANK SUPPLY VALVE ASSEMBLY
12 Claims, 3 Drawing Figs.

[52] U.S. Cl. ................................................ 137/414,
 137/432
[51] Int. Cl. .................................................. F16k 33/00
[50] Field of Search ...................................... 137/315,
 414, 429, 432, 269, 270, 270.5, 271; 251/290

[56] References Cited
UNITED STATES PATENTS

| 2,911,000 | 11/1959 | Doyle | 137/414 |
| 2,986,155 | 5/1961 | Doyle | 137/414 |
| 3,194,258 | 7/1965 | Grant | 137/414 |
| 3,285,277 | 11/1966 | Goldtrap | 137/414 |
| 3,429,333 | 2/1969 | Schoepe et al. | 137/414X |

*Primary Examiner*—William F. O'Dea
*Assistant Examiner*—David R. Matthews
*Attorney*—Christel & Bean ABSTRACT: A float is supported on a normally upright casing for rising and falling therealong. A housing on the casing above the float contains a pressure chamber defined in part by a control valve movable to interrupt communication between an inlet supply conduit and a tank filling outlet. The chamber is subject to inlet pressure at all times and the control valve remains closed until the chamber pressure is relieved by opening a bleed passage from the chamber. A valve control member is mounted for swiveling movement in opposite directions about the casing and in a direction canting a bleed valve to open the bleed passage in response to falling movement of the float to which it is connected by linkage, the linkage and the float being movable with the valve control member about the casing.

PATENTED JAN 12 1971

3,554,219

INVENTOR.
Harry W. Hudson
BY
Christel & Bean
ATTORNEYS.

TOILET TANK SUPPLY VALVE ASSEMBLY

BACKGROUND OF THE INVENTION

This invention relates generally to the plumbing art, and more specifically to a new and useful toilet tank supply valve assembly.

The design of toilet tank ball cocks poses many problems. If the actuating mechanism and connecting linkage are complex, the cost is apt to be increased and there is the danger that it will require periodic servicing and adjustment. Also, such mechanisms often require a predetermined orientation, complicating their installation in a tank. Where the ballcock uses materials which tend to corrode in a moist atmosphere, such corrosion tends to interfere with proper operation and to shorten the useful life of the assembly. Also, the fear of contaminating a water supply through back siphoning from the tank, should the supply pressure fail, is of very real concern. These and other factors must be kept in mind.

SUMMARY OF THE INVENTION

A primary object of my invention is to provide an antisiphoning toilet tank supply valve assembly constructed of materials which are noncorrosive in use and having relatively few moving parts of simple and durable construction.

Another object of my invention is to provide the foregoing in an assembly which requires no particular orientation in the tank for operation in the intended manner.

The present invention avoids the previously noted problems and disadvantages by using plastic and other noncorrosive materials throughout, and by providing a very simple actuating arrangement swiveled on the ballcock casing for freedom of movement in any relative orientation thereof. The tank filling passage from the casing is open to atmosphere in all positions of the actuating linkage to instantly and automatically interrupt any siphon chain which might otherwise be induced.

The foregoing and other objects, advantages, and characterizing features will become clearly apparent from the ensuing detailed description of a presently preferred embodiment thereof, reference being made to the accompanying drawing wherein like reference numerals denote like parts throughout the various views.

BRIEF DESCRIPTION OF THE DRAWING FIGURES

DESCRIPTION OF THE PREFERRED EMBODIMENT

Figure 1:
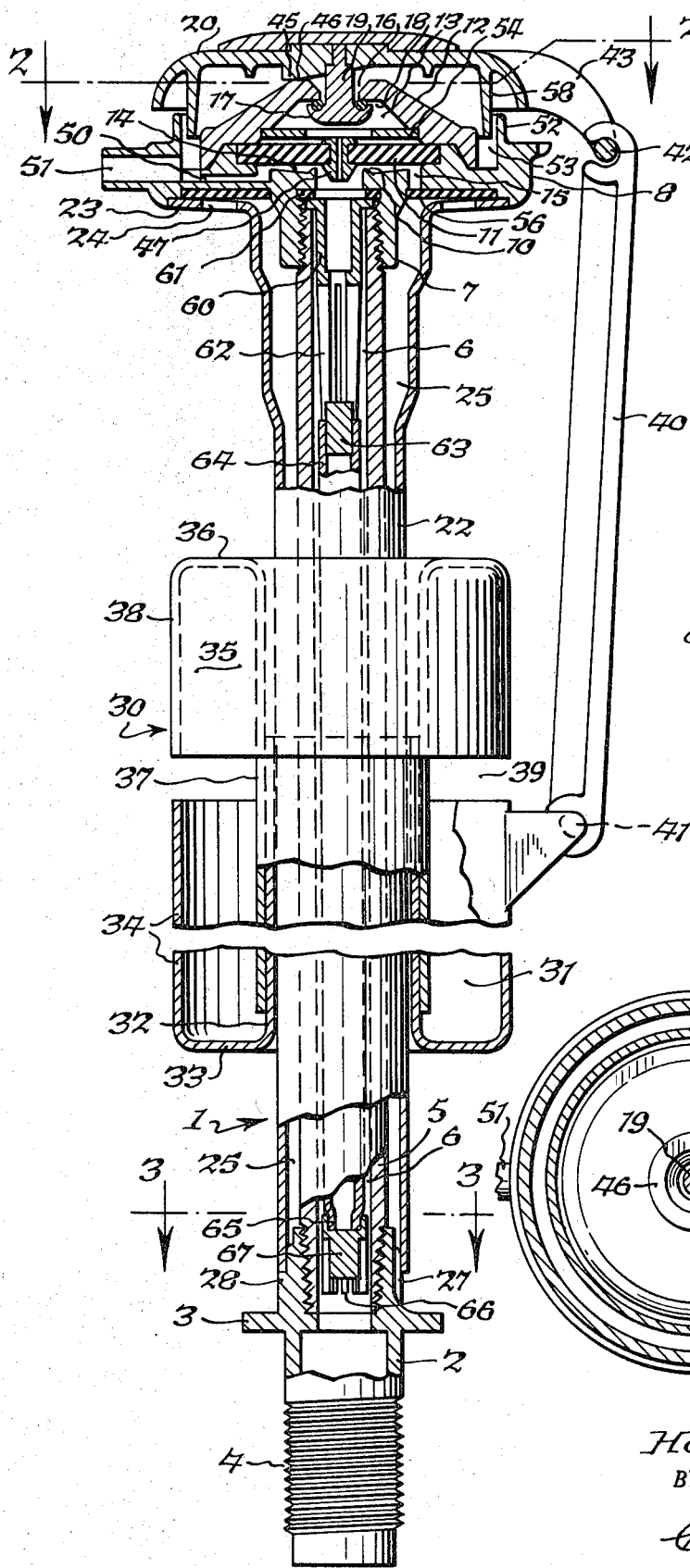
FIG. 1 is a view partly in side elevation and partly in vertical section, with parts broken away for clarity.
Figure 3:
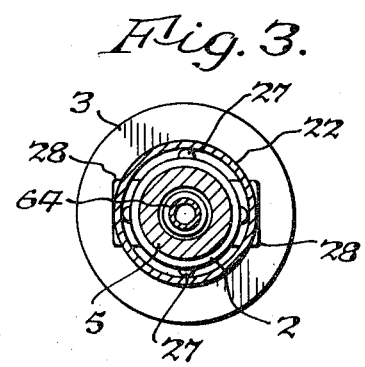
FIG. 3 is a horizontal sectional view thereof taken about on line 3—3 of FIG. 1.
Figure 2:
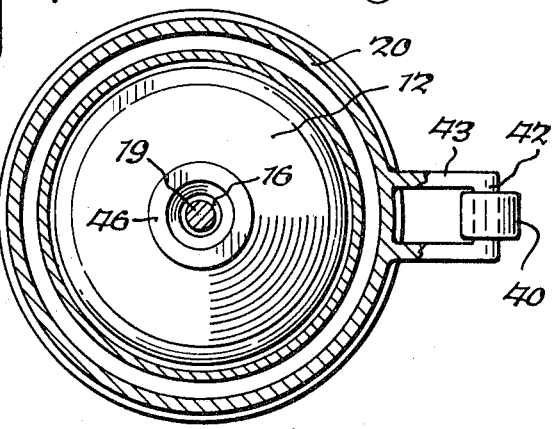
FIG. 2 is a horizontal sectional view thereof taken on about line 2—2 of FIG. 1.

Referring now in detail to the accompanying drawing there is shown a supply valve assembly of my invention comprising a normally generally upright casing, generally designated 1, carried by a fitting 2 having a flange 3 adapted to bear against the inner surface of the bottom wall of a typical toilet tank, not shown. Fitting 2 has a threaded end 4 adapted to extend through an opening in the tank bottom wall for connection to a supply line, not shown, and to receive a clamping nut on the underside of the tank, all of which is well understood by those skilled in the art, and therefore requires neither illustration nor further description.

Casing 1 includes an inner tubular section 5 threaded into fitting 2 at its lower end and providing a water inlet passage 6 therethrough communicating at its lower end with a corresponding passage through fitting 2. At its upper end, inner casing section 5 is threaded into a central boss 7 depending from the lower body portion 8 of a control valve housing.

Housing body 8 provides a valve seat 10 adapted to be closed by a diaphragm valve 11 in a manner to be described. Diaphragm 11 is clamped in place against a shouldered seat on body 8 at the outer edge of the diaphragm by a generally dome-shaped housing cover member 12 providing a chamber 13 defined by cover 12 and diaphragm 11. Water passes over seat 10, across the upper face 14 of body 7 to a series of downwardly directed, transfer passages 15 annularly spaced around seat 10.

A bleed passage 16, aligned with the axis of casing 1, extends through the upper end of cover 12 from chamber 13, and is adapted to be closed by a valve 17. The latter carries an O-ring bearing against the seat 18 provided on the under surface of the cover 12 around passage 16. Valve 17 has a stem 19 formed integrally therewith extending through passage 16 and connected to a disc-shaped valve control member 20.

Casing 1 also includes a tubular outer casing section 22 concentric with inner section 5 and having at its upper end a laterally directed flange 23 secured at its outer edge to the under surface of housing body 7. An annular series of spaced air holes 24 are provided through flange 23, for a purpose to be described.

Tubular sections 5 and 22 define, between them, an annular tank filling water outlet passage 25 opening into an associated tank adjacent the bottom of casing 1, through the open lower end of casing section 22 in the passages provided between spacing ribs 27 and supporting shoulders 28 on fitting 2. It is noted that rib 27 shown at the lower right in FIG. 1 actually is spaced 90° from shoulder 28 shown at the lower left in FIG. 1, this being done to better illustrate the exit passages between ribs 27 and shoulders 28.

A float, generally designated 30, is mounted on casing 1 for rising and falling movement therealong. Float 30 includes a cup-shaped water chamber portion 31 having an upstanding, inner tubular wall 32 slidably encircling outer casing section 21, a bottom wall 33 and an upstanding, outer wall 34 concentric with the wall 32, the water chamber portion 31 being open at its top. Float 30 also includes an inverted cup-shaped air chamber portion 35 having a top wall 36, an inner tubular wall 37 telescopingly engaging wall 32 with sufficient friction to hold the float portions 31, 35 in adjusted position while permitting relative movement therebetween, and an outer wall 38 generally corresponding to the upstanding wall 34 of the water chamber portion. Walls 34 and 38 are spaced apart, as shown at 39. In use, water in an associated tank will fill water chamber portion 31 and, upon rising to the level of the open lower end of air chamber portion 35, will trap air therein, thereafter causing float 30 to rise with the rising water level. The frictional engagement between walls 32 and 37 causes them to move as a unit, except when they are manually, forcibly moved one relative to another.

Float 30 is connected to valve control member 20 by a link 40 pivotally connected at 41 to float 30 and at 42 to an extension 43 of valve control member 20. The latter includes, on its undersurface, a wedgelike fulcrum portion 45 resting on an annular bearing surface 46 around the passage 16.

Diaphragm valve 11 has a pressure equalizing passage therethrough, which can be provided by a tubular, headed, rivetlike member 47 positioned centrally therein and having a passage therethrough smaller than the effective sectional area of bleed passage 16. Chamber 13 therefore is open to inlet passage 6 at all positions of valve 11.

With valve 17 closed, water passing through tubular member 47 into chamber 13 will cause valve 11 to close against seat 10 because of the greater surface area of valve 11 subject to inlet water pressure on the chamber side thereof. Closing of valve 11 on seat 10 shuts off the supply of water to the associated tank.

When the tank is flushed, however, the water level drops and float 30 moves downwardly. Lowering or falling of float 30 is translated by link 40 into rocking of valve control 20 on its fulcrum 45, canting valve 17 to open bleed passage 16. Because valve 17 is canted, the seal between ring 17 and seat 18 is broken quite easily, notwithstanding the pressure in chamber 13. Opening passage 16 relieves the pressure in chamber 13, permitting water to escape through bleed passage 16 whereupon the inlet pressure will move valve 11 away from seat 10 to an open position. Water then can pass from inlet passage 6 across valve seat 10 and the surrounding face 14 to transfer passages 15 and therethrough to outlet passage 25. Chamber 13 contains an annular stop 54, to block opening of valve 11 beyond a predetermined point.

As the tank commences to fill, the rising water level will eventually raise float 30, which will rock member 20 upwardly to a position closing the valve 17. Pressure in chamber 13 will then build up, hydraulically closing valve 11 against seat 10 and shutting off the ingress of water.

As water passes over seat 10 and face 14 to transfer passages 15, some of it is diverted through a generally horizontal bypass 50 to a bowl filling conduit nipple 51, for filling the bowl of the associated toilet, in a manner readily understood by those skilled in the art. Housing body 7 includes an upstanding wall 52 spaced outwardly from cover 12 to provide an annular channel 53 surrounding the housing. Water escaping through bleed passage 16 runs down the dome-shaped cover 12 into channel 53 which communicates with bowl filling outlet nipple 51. Thus, the entire tank filling action occurs at the lower end of casing 1, to avoid the sound accompanying falling water and insure quietness in operation.

If at any time there should be a failure in supply pressure, tending to create a syphon chain which otherwise might tend to syphon water from an associated tank backwardly through the supply assembly, that is prevented by my invention because tank filling passage 25 is always open to ambient air through air inlets 24 at the upper end of casing 1.

Further, I provide an annular diaphragm valve 56 fixed at its outer edge portion underlying and normally closing transfer passages 15. The inner edge portion of valve 56 will move downwardly as water passes through passages 15 to permit passage of water to outlet passage 25, but will close to prevent back passage of water. It will be noted that air inlet passages 24 are spaced laterally outwardly from transfer passages 15, and that as the inner edge portion of valve 56 is deflected downwardly by the passage of water through the passages 15, it will divert water away from the air inlet openings 24 and downwardly into passage 25.

It is a particular feature of my invention that the valve assembly is operable in any angular orientation of casing 1 and the relatively moving parts. Valve 17 is rigidly connected through stem 19 with control member 20. Bleed passage 16 is aligned with the axis of casing 1, whereby valve 17 and stem 19 comprise a swivel mounting, permitting valve control member 20 to rotate in opposite directions about the axis of casing 1. Float 30 is freely rotatable about casing 1, in either direction, and the pivotal link connection 40 therebetween permits these parts to be rotated to whatever position may be best for proper operation. The annular bearing surface 46 provides a bearing surface for valve control member fulcrum 45 in any angular or rotary position of the latter. In fact, the swivel mounting thus described would permit a nutating type of action, although such is not contemplated in normal operation.

Thus, when the ballcock is installed casing 1 can be slipped into place with the nipple 51 directed generally toward the bowl filling pipe of the tank. Float 30, connecting link 40 and valve control member 20 then are rotated to whatever position permits their free operation, without interference from the tank walls or elsewhere. Even if, in the course of use, the angular position of these parts should shift that will not matter because they will operate in any rotary position and are free to shift position as may be required during operation to avoid any interference.

Valve control member 20 has a depending, annular skirt 58 formed with an incline lower edge to provide a skirt of greatest length opposite the link 40. Skirt 58 is aligned with channel 53, and overlaps upstanding wall 52 in all rotary positions of member 20, and in all operational positions thereof. In other words, as member 20 is rocked downwardly to open valve 17, the longest portion of skirt 58 is lifted but will still remain within channel 53 as defined by upstanding wall 52. Skirt 58 insures that water passing through bleed passage 16 will be diverted to collecting passage 53.

A strainer is provided in the form of a cup 60 having a flanged upper end clamped against a gasket 61 by the upper end of casing section 5. The strainer has a reduced diameter lower end 63 joined to cup 60 by a cage 62 comprising a grid of parallel bars the outer sides of which taper from cup 60 to end 63. The bars define a series of vertically elongated lateral passages placing inlet passage 6 in communication with the upwardly opening interior of cup 60 through a central opening in the bottom wall thereof. Cup 60, cage 62 and end 63 preferably comprise a one-piece, integral construction.

A tube 64 of resiliently yieldable, preferably plastic material is mounted at its upper end or the lower end 63 of the strainer. At its lower end, tube 64 is mounted in the cup-shaped upper end 65 of a pressure regulator 67 of slightly smaller diameter than the bore of casing section 5, leaving an annular, restricted passage therebetween. A cage 66 is provided by a grid of parallel bars extending along the body of regulator 67 and projecting beyond the lower end thereof. The cage bars define a series of restricted passageways.

I have found that providing regulator 67 adjacent the lower end of casing 1, spaced from the upper end thereof by tube 64, produces a significant reduction in the noise accompanying operation of the ballcock. While I am not entirely certain of the reason for this, I believe that it results from the provision of a pressure reducer at the lower end of the casing. Tube 64 spaces regulator 67 from the upper end of casing 1, mounting and positioning the same, and in addition provides a shock-absorbing pneumatic cushion in the inlet passage 6.

Accordingly, it is seen that my invention fully accomplishes its intended objects. All of the parts can be made of suitable noncorrosive, synthetic plastic material, including the seals and valve diaphragms which, however, also could be made of a natural or synthetic rubber. Thus, there are no parts subject to corrosion. The plastic parts 23 and 8, 8 and 12 and 19 and 20 can be welded together ultrasonically. The relatively movable parts have a simple connecting arrangement, to insure trouble free operation and problems of interference are avoided by the freedom of this ballcock from any need for a particular orientation of the operating parts. Extreme quietness in operation is provided.

Having fully disclosed and completely described my invention, it will be appreciated that the foregoing is by way of illustration only, and such modifications and variations as will naturally occur to those skilled in the art are intended to be included within the scope of the appended claims.

I claim:

1. A toilet tank supply valve assembly comprising a normally upright casing, a float supported on said casing for rising and falling movement therealong in response to predetermined changes in the water level in an associated tank, a water inlet passage to said casing, a water outlet passage from said casing, a housing on said casing adjacent the upper end thereof above said float, means including a first valve defining a pressure chamber in said housing and in communication with said inlet passage, said first valve being movable by the pressure of water in said chamber to control communication between said inlet and outlet passages, a bleed passage from said chamber, a second valve normally closing said bleed passage, a valve control member mounted for swiveling movement in opposite directions about the axis of said casing and in a direction canting said second valve to open said bleed passage and cause movement of said first valve to a position placing said inlet and outlet passages in communication, means connecting said float to said valve control member for moving the latter to open said bleed passage in response to falling movement of said float, said last-named means and said float being movable with said valve control member in opposite directions about the axis of said casing, means on said housing including an upstanding wall providing an upwardly opening channel encircling said chamber below said bleed passage, a bowl filling conduit communicating with said inlet passage when said first valve is in a position placing said inlet and outlet passages in communication, said bowl filling conduit also communicating with said channel whereby water escaping through said bleed passage is diverted by said channel to said bowl filling conduit, said valve control member comprising a disc having a depending annular skirt aligned with said channel in overlapped relation to said upstanding wall in all positions of said valve control member, and means positioned radially within said skirt of said valve control member providing a pivot for rocking said control member upon falling movement of said float.

2. A supply valve assembly as in claim 1, wherein said means connecting said float to said valve control member comprises a link pivotably connected to said float and to said valve control member for rocking the latter in response to rising and falling of the former.

3. A supply valve assembly as set forth in claim 1, wherein bleed passage opens upwardly through said housing, said second valve being in said chamber and having a stem extending through said bleed passage and connected to said valve control member, said second valve and stem comprising a swivel mounting for said valve control member on said housing.

4. A supply valve assembly as set forth in claim 1, wherein said bleed passage is aligned with said casing axis, and wherein said means providing a pivot comprises means on said housing providing an external bearing surface around said bleed passage, and means on said valve control member providing a fulcrum engaging said bearing surface for canting said second valve upon falling movement of said float.

5. A supply valve assembly as set forth in claim 1, wherein said float includes a meter chamber portion and an air chamber portion arranged for relative movement lengthwise of said casing thereby to vary the level of water normally maintained in an associated tank.

6. A supply valve assembly as set forth in claim 1, wherein said casing includes inner and outer generally concentric tubular sections, said inlet passage extending through said inner section from the lower end of said casing, said tank filling outlet passage extending between said inner and outer sections from said upper end of said casing and having an outlet from said outer section adjacent said lower end of said casing.

7. A supply valve assembly as set forth in claim 6, together with an air inlet opening through said outer casing section adjacent said housing and above said float, whereby said tank filling passage, at all times, is open to atmosphere.

8. A supply valve assembly as set forth in claim 7, together with transfer passage means from said first valve to said tank filling outlet passage, one-way valve means normally closing said water passage means and opening to permit the passage of water therethrough into said outlet passage, said outer casing section having a laterally outwardly directed flange adjacent said upper end of said casing, said air inlet opening being located in said flange laterally outwardly of said transfer passage means and being generally downwardly directed.

9. A supply valve assembly as set forth in claim 8, wherein said one-way valve means comprise an annular diaphragm having a fixed outer edge portion and an inner edge portion underlying said transfer passage means, said inner edge portion being operable to divert water away from said air inlet opening.

10. A supply valve assembly as defined in claim 6, together with pressure reducing means in said inner casing section adjacent the lower end of said casing.

11. A supply valve assembly as set forth in claim 10, together with a strainer carried by said inner casing section adjacent the upper end of said casing, and a resiliently yieldable tube extending within said inner casing section and providing a pneumatic cushion therein, said tube being secured adjacent its upper end to said strainer and said pressure reducing means comprising a regulator member carried by said tube adjacent the lower end thereof.

12. A supply valve assembly as set forth in claim 1 wherein said first valve is movable to a closed position closing off said outlet passage from said inlet passage, a pressure equalizing passage placing said chamber in communication with said inlet passage whereby said chamber is subject to inlet pressure when said first valve is in said closed position, said first valve normally being held in said closed position by the pressure of water in said chamber, and said pressure equalizing passage being restricted relative to said bleed passage whereby opening of the latter relieves the pressure in said chamber for movement of said first valve out of said closed position and into the position placing said tank filling outlet passage in communication with said inlet passage.